United States Patent
Storer

(10) Patent No.: US 9,710,346 B2
(45) Date of Patent: *Jul. 18, 2017

(54) DECOUPLED RELIABILITY GROUPS

(71) Applicant: NetApp, Inc., Sunnyvale, CA (US)

(72) Inventor: Mark Walter Storer, Walnut Creek, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/172,313

(22) Filed: Jun. 3, 2016

(65) Prior Publication Data

US 2016/0283337 A1    Sep. 29, 2016

Related U.S. Application Data

(63) Continuation of application No. 13/708,784, filed on Dec. 7, 2012, now Pat. No. 9,367,394.

(51) Int. Cl.
*G06F 11/20*   (2006.01)
*G06F 11/10*   (2006.01)

(52) U.S. Cl.
CPC ...... *G06F 11/2094* (2013.01); *G06F 11/1004* (2013.01); *G06F 11/1092* (2013.01); *G06F 2201/805* (2013.01); *G06F 2211/1061* (2013.01)

(58) Field of Classification Search
CPC ........... G06F 11/10; G06F 12/06; G06F 12/12
See application file for complete search history.

(56) References Cited

U.S. PATENT DOCUMENTS

| | | | |
|---|---|---|---|
| 4,092,732 A | 5/1978 | Ouchi | |
| 4,761,785 A | 8/1988 | Clark et al. | |
| 6,041,423 A | 3/2000 | Tsukerman | |
| 6,970,987 B1 | 11/2005 | Ji et al. | |
| 7,636,814 B1 * | 12/2009 | Karr | G06F 12/0804 711/143 |
| 8,745,638 B1 | 6/2014 | Adya et al. | |
| 2004/0250028 A1 | 12/2004 | Daniels et al. | |

OTHER PUBLICATIONS

International Preliminary Report on Patentability for Application No. PCT/US2013/073537 mailed on Jun. 9, 2015, 7 pages.
International Search Report and Written Opinion for Application No. PCT/US2013/073537 mailed on Mar. 7, 2013, 11 pages.

* cited by examiner

*Primary Examiner* — Charles Rones
*Assistant Examiner* — Han Doan
(74) *Attorney, Agent, or Firm* — LeClairRyan, a Professional Corporation

(57) ABSTRACT

Methods and apparatuses for updating members of a data storage reliability group are provided. In one exemplary method, a reliability group includes a data zone in a first storage node and a checksum zone in a second data storage node. The method includes updating a version counter associated with the data zone in response to destaging a data object from a staging area of the data zone to a store area of the data zone without synchronizing the destaging with the state of the checksum zone. The method further includes transmitting, from the data zone to the checksum zone, an update message indicating completion of the destaging of the data object, wherein the update message includes a current value of the version counter.

18 Claims, 11 Drawing Sheets

DECOUPLED RELIABILITY GROUPS

This application is a continuation of prior U.S. patent application Ser. No. 13/708,784, filed Dec. 7, 2012, which is herein incorporated by reference.

TECHNICAL FIELD

Various embodiments of the present application generally relate to management of data storage devices. More specifically, various embodiments of the present application relate to managing data updates across data storage nodes of a reliability group.

BACKGROUND

The proliferation of computers and computing systems has resulted in a continually growing need for efficient and reliable data storage. Storage servers are often used to provide storage services related to the organization and storage of data, to one or more clients. The data is typically stored on writable persistent storage media, such as non-volatile memories and disks. A storage server is configured to operate according to a client/server model of information delivery to enable one or more clients (devices or applications) to access the data served by the system. A storage server can employ a storage architecture that serves the data with both random and streaming access patterns at either a file level, as in network attached storage (NAS) environments, or at a block level, as in a storage area network (SAN).

In some data storage systems, groups of storage servers field input/out (I/O) operations (i.e., reads and writes) independently, but are exposed to hosts or clients as a single device. A group of storage servers operating in this manner is often called a "storage cluster." Each storage server in a cluster may be called a "storage node," a "data node," or just a "node." It is common to "stripe" data across storage nodes in a manner similar to how data is striped across disks in RAID arrays. Striping the data across nodes in this manner can provide improvements to random I/O performance without decreasing sequential I/O performance. In this configuration, each stripe of data may be called a storage zone, a data zone, or simply a zone. Each node may contain multiple zones. In some cases, error detection or correction information may also be stored in one or more of the nodes in a cluster. The error detection or correction information is often stored in dedicated stripes which are often referred to as checksum zones or parity zones.

In an erasure coded data system, forward error correction codes are used to improve data reliability and improve the ability to recover from data errors. Erasure coding transforms a data set containing n data elements into a longer data set containing m additional data elements that are often referred to as checksum elements. The checksum elements are generated in a manner such that the original n data elements can be recovered from one or more subsets of the combined m+n data elements. Similar to the parity concept in RAID systems, the checksum elements provide an error protection scheme for the data elements. In case one or more data elements is inaccessible, fails, or contains erroneous data, the checksum elements may be utilized in combination with the remaining valid data elements to correct the error or restore the data elements. In this way, the original data can be recovered even though some of the original m data elements may be lost or corrupted.

In a distributed erasure coded data system, the data zones and the checksum zones are spread across multiple nodes. The various nodes that contain the data zones and the checksum zones for a data set are often referred to as a reliability group. Each data zone in a reliability group may reside on a separate node, or several data zones in the reliability group may reside on the same node. In addition, the parity zones may also reside on separate nodes. In some cases, the nodes associated with a reliability group are each in a different physical location.

In order to properly recover from an error at any point in time, updates to the data zones and the associated checksum zones must typically remain synchronized. If an attempt to recover from an error in a recently changed data element is made using a checksum zone that has not yet been updated with respect to a change in an associated data zone, the recovery attempt will likely fail or produce an incorrect result.

The traditional method for maintaining data synchronization or consistency across independent storage nodes in a distributed storage system is through the use of multi-phase commit protocols, for example two-phase and three-phase commit protocols. In multi-phase commit protocols, data elements and checksum elements are updated in lockstep such that decisions to commit changes or to roll back to previous versions of the data are made in a coordinated, atomic manner. Using these protocols, a data element will typically not commit data to storage until data or checksum elements in other nodes have indicated that the nodes are ready to perform corresponding data storage steps at the same time.

While multi-phase commit protocols provide a number of benefits, they also suffer from a variety of problems. First, as the name suggests, they involve multiple rounds of communication. These multiple rounds of communication among the nodes in a cluster introduce additional latency and resource demands. Second, the error scenarios that can occur when using multi-phase commit protocols are often complex. Third, when a group of nodes is involved in a process utilizing a multi-phase commit protocol, each of the nodes in the group must move in lock-step with one another, in known techniques. Consequently, the progress made by each of the nodes in the group is limited by the node of the group that is making the least or slowest progress. In other words, synchronization requires that the nodes of a reliability group wait for other nodes of the group to complete certain steps before they can proceed.

SUMMARY

Methods and apparatuses for managing updates in data storage reliability groups are provided. These methods and apparatuses resolve at least some of the problems described above by decoupling the update processes of data zones in a reliability group from the update processes of the checksum zones in the reliability group. For example, data updates may be performed in data elements of a reliability group without having to wait for a specific state, update status, or readiness of the associated checksum element(s). The checksum element(s) can perform updates at an independent rate such that there is no timing dependency between the data elements and the checksum element(s). Although decoupled, the checksum element(s) will eventually become consistent with the data elements.

In one embodiment, a method of updating the members of a reliability group is provided. The reliability group includes a data zone in a first storage node and a checksum zone in a second data storage node. The method includes updating a version counter associated with the data zone in response to destaging a data object from a staging area of the data zone to a store area of the data zone. The destaging is not synchronized with the state of the checksum zone. The method further includes transmitting, from the data zone to the checksum zone, an update message indicating completion of the destaging of the data object, wherein the update message includes a current value of the version counter.

In another embodiment, a data storage system is provided. The data storage system includes a parity storage zone and a data storage zone. The data storage zone is configured to store a data object in a staging area of the data storage zone and transfer the data object to a store area of the data storage zone without establishing a commit protocol with the parity storage zone. The data storage zone is further configured to update a revision value associated with the data storage zone in response to the transfer and transmit an update message to the parity zone indicating completion of the transfer. The update message includes the revision value. The parity storage zone is configured to receive the update message and identify prior unprocessed update messages associated with the data storage zone by comparing the revision value in the update message to an element of a contribution vector associated with the data storage zone. The parity storage zone is further configured to sequentially generate and store, in a store area of the parity storage zone, checksum information associated with the prior unprocessed update messages and the update message in an order determined based on the revision value and revision values of the unprocessed update messages. Finally, the parity storage zone is configured to update the element of the contribution vector.

Using the techniques introduced here, the updating of data elements and the updating of associated checksum elements in a reliability group of a data storage system can decoupled, thereby eliminating drawbacks of multi-phase commit protocols discussed above. In some cases, revision values and contribution vectors are used to track the relative states of the checksum element(s) with respect to the data elements allowing the system to properly recover from errors even though the update processes have been decoupled. These techniques reduce the amount of communication needed between the nodes, allow the nodes to progress at their own rates, and provide more easily enumerated error scenarios if failures do occur.

Embodiments introduced here also include other methods, systems with various components, and non-transitory machine-readable storage media storing instructions that, when executed by one or more processors, direct the one or more processors to perform the methods, variations of the methods, or other operations described herein. While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

DETAILED DESCRIPTION

In distributed data storage systems, multi-phase commit protocols are traditionally used to coordinate updates of data elements with updates to the associated checksum elements. However, multi-phase commit protocols require multiple rounds of communication, require the elements to perform updates in lockstep with each other, and produce complex error scenarios. The techniques introduced here allow updates to data elements in a clustered data storage system to be decoupled from updates to the checksum elements. Data elements and the associated checksum elements are updated independently and the relative states of these elements are tracked using a version counter such that data recovery operations can be performed at any time even though the update processes have been decoupled. These techniques reduce the amount of communication needed between the nodes of a reliability group. These techniques also allow the nodes to perform updates at their own pace without being limited by the lockstep requirements of multi-phase commit protocols while still providing flexible data recovery capabilities and without potentially triggering the complex error scenarios associated with multi-phase commit protocols.

Figure 1:
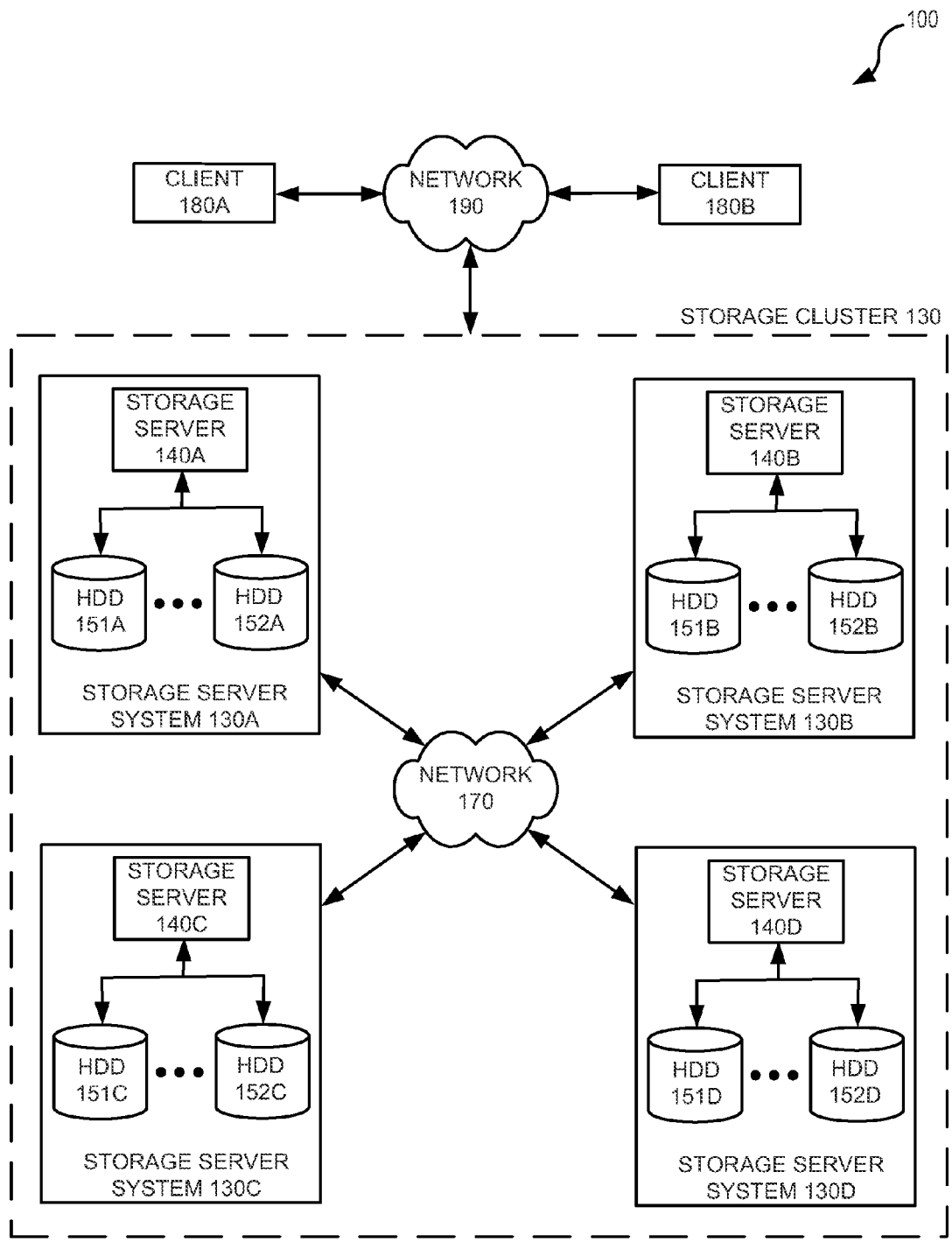
FIG. 1 illustrates an operating environment in which some embodiments of the disclosed techniques may be utilized.

FIG. 1 illustrates operating environment 100 in which some embodiments of the disclosed techniques may be utilized. Operating environment 100 includes storage cluster 130, client 180A, client 180B, and network 190.

Storage cluster 130 includes a plurality of storage server systems 130A, 130B, 130C, and 130D. The storage server systems can communicate with each other through a network 170. Network 170 may be, for example, a local area network (LAN), a wide area network (WAN), a metropolitan area network (MAN), a global area network such as the Internet, a Fibre Channel fabric, or a combination thereof. Each of clients 180A and 180B may be, for example, a personal computer (PC), a server, a workstation, a mobile computing device, a tablet, a smartphone, or another type of computing device. Clients 180A and 180B communicate with storage cluster 130 through network 190, which can also be, for example, a LAN, a WAN, a MAN, a global area network such as the Internet, a Fibre Channel fabric, or a combination thereof. The elements of storage cluster 130 may be distributed among multiple physical or geographic locations.

Each of storage server systems 130A, 130B, 130C, and 130D include a storage server and hard disk drives (HDDs). For example, storage server system 130A includes storage server 140A and HDDs 151A through 152A. Each of storage servers 140A, 140B, 140C, and 140D is a computing device that provides storage services to client 180A and/or client 180B related to the organization and storage of data on the associated HDDs. Each of the storage server systems may provide file level data access services to hosts, as in a NAS environment, or block level data access services as in a SAN environment, or each may be capable of providing both file level and block level data access services to the clients.

Each of storage servers 140A, 140B, 140C, and 140D may contain a storage operating system that manages operations of the associated HDDs. Although each storage server system is illustrated with only two HDDs, typical storage server systems will have more than two HDDs. In some embodiments, the HDDs may be configured as a Redundant Array of Inexpensive Disks (RAID) in which the associated storage server accesses the data on the HDDs using a conventional RAID algorithm. Each storage server system may also include another type of data storage device such as a solid state memory, an optical disk, a tape drive, or any combination of these devices. The elements of each of the storage server systems may also be distributed across multiple physical or geographic locations.

Storage cluster 130 is a logical arrangement of storage server systems 130A, 130B, 130C, and 130D. When storage cluster 130 is operated as a distributed data storage system with error recovery capabilities, data elements may be stored in one or more of storage server systems 130A, 130B, 130C, or 130D while checksum elements are stored in other of these storage server systems. For example, data elements associated with a data set may be stored in storage server systems 130A and 130D, while a checksum element associated with the data elements is stored in storage server system 130B. In this example, the techniques disclosed herein allow the updating of the checksum element in storage server system 130B to be decoupled from the updating of the data elements in storage server systems 130A and 130D such that the updates are not coordinated using a multi-phase commit protocol and are not performed in lockstep (i.e., one update is performed according to a timing that is independent of a timing of another update). However, even though these updates are decoupled, information about the relative states of the updates is maintained such that checksum information from the checksum element can still be used to reliably recover from an error in the data element even if the data element is in a different update state than the checksum element.

In some cases, storage cluster may be configured in a Redundant Array of Independent Nodes (RAIN) architecture. RAIN is a data storage and protection system architecture that uses an open architecture combining standard computing and networking hardware with management software to create a distributable and scalable data storage system. RAIN utilizes RAID nodes linked together into a larger storage mechanism. A RAIN configuration uses multiple storage server systems, such as storage server systems 130A-D, each having their own RAID functionality and being used together in a parity or mirrored implementation. In some cases, a RAIN implementation may also be referred to as a storage grid.

Figure 2:
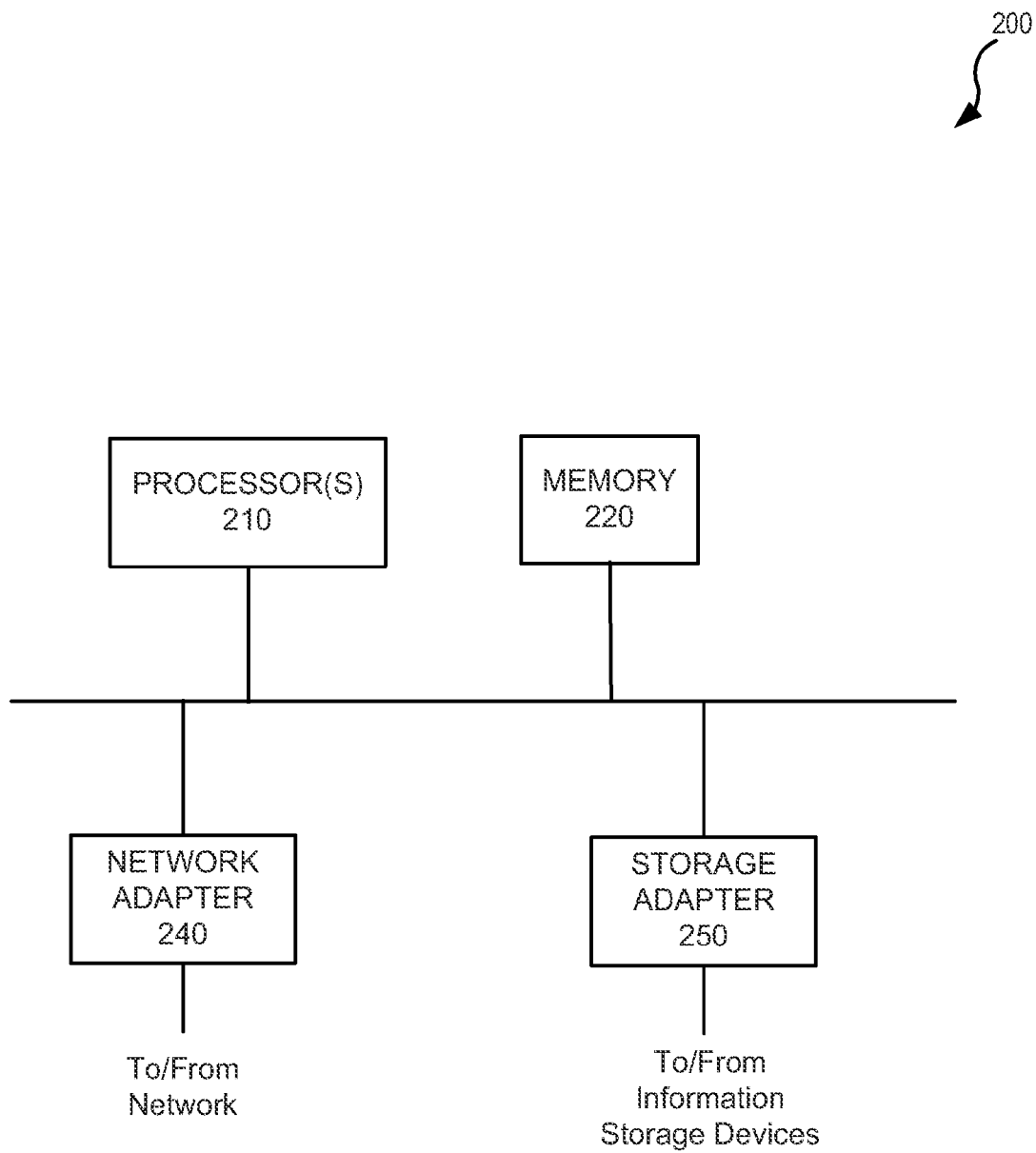
FIG. 2 illustrates a storage server that may be used in an embodiment of the disclosed techniques.

FIG. 2 illustrates storage server 200 that may be used in an embodiment of the techniques disclosed here. Storage server 200 is an example of any of storage servers 140A, 140B, 140C, and 140D. Storage server 200 includes processor(s) 210, memory 220, network adapter 240, and storage adapter 250. Processor(s) 210 may perform storage management functions to implement a decoupled data storage cluster using the techniques described herein. In some cases, storage server 200 may also be implemented as a virtual machine or a virtual server.

Processor(s) 210 may be a microprocessor, a central processing unit (CPU), programmable circuitry programmed with software and/or firmware, programmable circuitry programmed with special-purpose hardwired circuitry, or a combination of these devices. Special-purpose hardwired circuitry may be in the form of, for example, one or more application-specific integrated circuits (ASICs), programmable logic devices (PLDs), field-programmable gate arrays (FPGAs), other configurable devices, or a combination thereof.

Network adapter 240 includes one or more ports to couple storage server 200 with one or more clients, hosts, or other storage servers, over a point-to-point link, a WAN, a LAN, a virtual private network implemented over a public network (Internet), or a combination thereof. Network adapter 240 can include the mechanical components as well as the electrical and signaling circuitry needed to connect storage server 200 to a network. Clients and hosts can communicate with storage server 200 over the network by exchanging packets or frames of data according to pre-defined protocols, such as Transmission Control Protocol/Internet Protocol (TCP/IP).

Storage adapter 250 provides an interface to information storage devices. The information storage devices may be any type of attached array of writable storage media, such as magnetic disk, tape, optical disk (e.g., CD-ROM or DVD), flash memory, solid-state drive (SSD), electronic random access memory (RAM), micro-electro mechanical memory, and/or any other similar media adapted to store information, including data and parity information. Storage adapter 250 includes a plurality of ports having I/O interface circuitry that couples with the storage devices over an I/O interconnect arrangement, such as a conventional high-performance, Fibre Channel link topology.

Memory 220 comprises storage locations that are addressable by processor(s) 210 for storing computer-executable software program code and data associated with the techniques introduced here. In some cases, memory 220 may also be accessible by network adapter 240 and/or storage adapter 250.

In one example of the techniques introduced here, processor(s) 210 executes computer-readable instructions from memory 220 to decouple update operations of a data element in storage server 200 from updates of an associated checksum element in another storage server through the use of update counters. The checksum element may be stored in another server like storage server 200. The other storage server manages the updates of the checksum element with a timing that is independent from the timing of the updating of the data elements.

Figure 3:
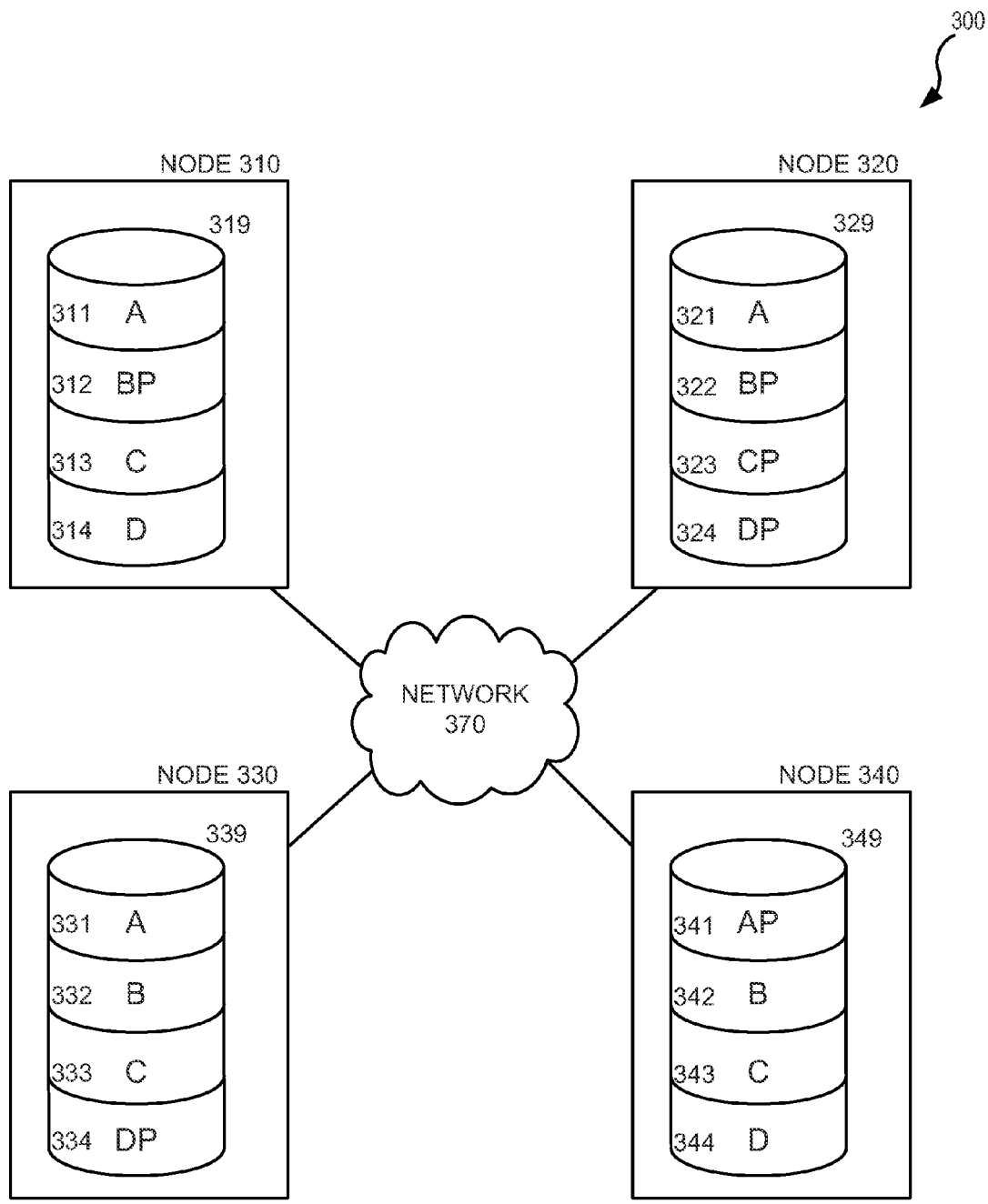
FIG. 3 illustrates an example of a data storage cluster in which some embodiments of the disclosed techniques may be utilized.

FIG. 3 illustrates a data storage cluster 300 for use with the techniques disclosed herein. Data storage cluster 300 includes nodes 310, 320, 330, and 340 interconnected by a network 370. Each of nodes 310, 320, 330, and 340 is an example of the storage server systems of FIG. 1. Each of nodes 310, 320, 330, and 340 is a data storage node and has a persistent storage 319, 329, 339, and 349, respectively. Each of the persistent storages 319, 329, 339, and 349 includes one or more logical data containers referred to as a storage zone, or a zone.

Multiple zones from some or all of the nodes can be grouped together as a reliability group. A reliability group may use error detection, error correction, and/or error control algorithms in order to improve the reliability of data stored in the reliability group and provide a means of recovering from data errors. For example, the "A" zones (311, 321, and 331) and the "AP" zone (341) in FIG. 3 may form one reliability group. Within this reliability group, the three A zones (311, 321, and 331) are data zones for storing data. The "AP" zone (341) is a parity zone of the reliability group and may also sometimes be referred to as reliability zone. Parity zone 341 stores reliability data that are metadata determined from the data of data zones 311, 321, and 331 of the reliability group. The reliability data may be determined from various methods, such as a simple XOR operation, a Reed-Solomon erasure code algorithm, or another algorithm, including combinations thereof. The reliability data provides an error protection scheme. For example, when one zone within the reliability group is not accessible or the associated data has been lost or corrupted, data of that zone can typically still be recovered from the remaining zones of the reliability group. In some cases, the nodes are in different physical locations to reduce the likelihood that more than one of the nodes will be affected by a natural disaster, power outage, or other event at any one point in time.

In some cases, a reliability group may contain more than one parity zone. For example, reliability group D of storage cluster 300 contains two "D" data zones (314 and 344) and two "DP" parity zones (324 and 334) form another reliability group. The ratio of the number of parity zones to the number data zones in a reliability group may depend on multiple factors including the type of error correction algorithm used, the desired level of robustness to multiple simultaneous failures, or other factors, including combinations thereof. For example, using two parity zones for a reliability group with a fixed number of data zones generally provides more robust error protection than using a single parity zone for those data zones.

Figure 4A:
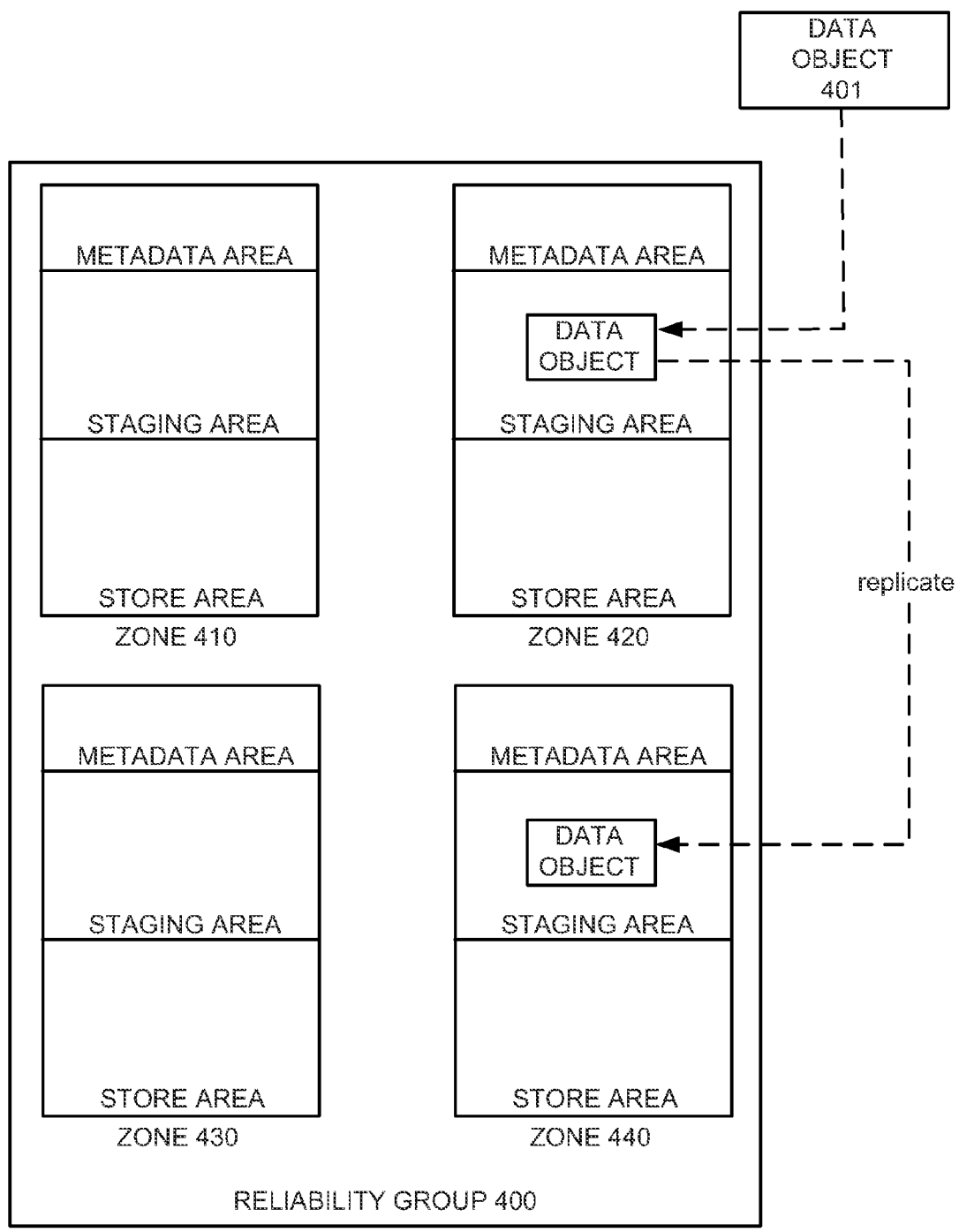
FIG. 4A illustrates an example of a data reliability group in which a data object is received for storage in a reliability group in accordance with some embodiments of the disclosed techniques.

FIG. 4A illustrates reliability group 400 in which some embodiments of the disclosed techniques may be utilized. Reliability group 400 is an example of one of the reliability groups in the data storage cluster of FIG. 3. Reliability group 400 includes zones 410, 420, 430, and 440. Reliability group 400 is a logical group and the zones which make up reliability group 400 will typically be located in different storage systems, in different nodes, and/or sometimes in different physical locations, as discussed with respect to FIG. 3. For example, zones 410, 420, and 430 may be the three "A" zones of FIG. 3, while zone 440 is the "AP" zone of FIG. 3. Many other relationships and configurations are possible.

Each of zones 410, 420, 430, and 440 contain a metadata area, a staging area, and a store area. The staging area is a storage location that is used for temporarily storing data objects that have been received by a zone but have not yet been processed and/or have not been committed to persistent storage in a store area. When a node receives a request to write data for a client, the request includes the data object and the node typically stores the data object in the staging area of the zone the data will be written to and responds with an acknowledgement to the client. The staging area is sometimes implemented using low latency memory devices in order to improve response times to clients. For example, the staging area may comprise nonvolatile random access memory (NVRAM), flash memory, another type of nonvolatile memory, or a combination thereof. The data object is typically processed and committed to long-term persistent storage (i.e. the store area) after the acknowledgement has been sent to the client. The metadata area of each zone contains information about the data objects stored in each zone such as their locations within the zone and their sizes.

Each of zones 410, 420, 430, and 440 may be configured as a data zone or a checksum zone. In the example of FIG. 4A, zone 420 is a data zone of reliability group 400 and zone 440 is a checksum zone of reliability group 400. When data object 401 is received at zone 420, it is stored in the staging area of zone 420. The data object is then replicated to the staging area of zone 440. Since zone 440 is being used as a checksum zone in this example, it will process the data object to generate checksum information associated with the data object.

In order to commit data object 401 to storage, the data object needs to be destaged in zone 420. Destaging is performed by storing the data object in persistent storage of the store area of zone 420, removing the data object from the staging area, and updating information in the metadata area accordingly. However, using traditional techniques, checksum information in zone 440 needs to be updated at the same, or nearly the same time, such that it will properly reflect checksum information for the data object that was just stored in the store area. Using traditional techniques, the objective is to update zone 420 and zone 440 in lockstep in order to minimize the situations in which a failure might occur and the two are not up to date with each other.

In many cases, lockstep is accomplished using multi-phase commit protocols. Using these types of protocols, zone 420 would not have been permitted to destage the data object to the store area until a series of communications between zone 420 and zone 440 indicated that zone 440 was also ready to update the checksum information associated with the data object in the store area of zone 440 simultaneously, or near simultaneously, with the destaging of the data object in zone 420. This timing relationship is necessary in traditional methods to insure that the two zones are updating their store areas as closely to each other in time as possible in order to eliminate or minimize the possibility that an error occurs when one has been updated but the other has not.

The techniques disclosed herein allow the lockstep timing relationship to be eliminated through use of one or more version counters and contribution vectors which allow zones 420 and zone 440 to be updated on independent schedules while still being able to support data reconstruction in most failure scenarios. As illustrated in FIG. 4A, when zone 420 receives and stages a data object, it transmits a copy of that data object to one or more checksum or parity zones, zone 440 in this case.

Figure 4B:
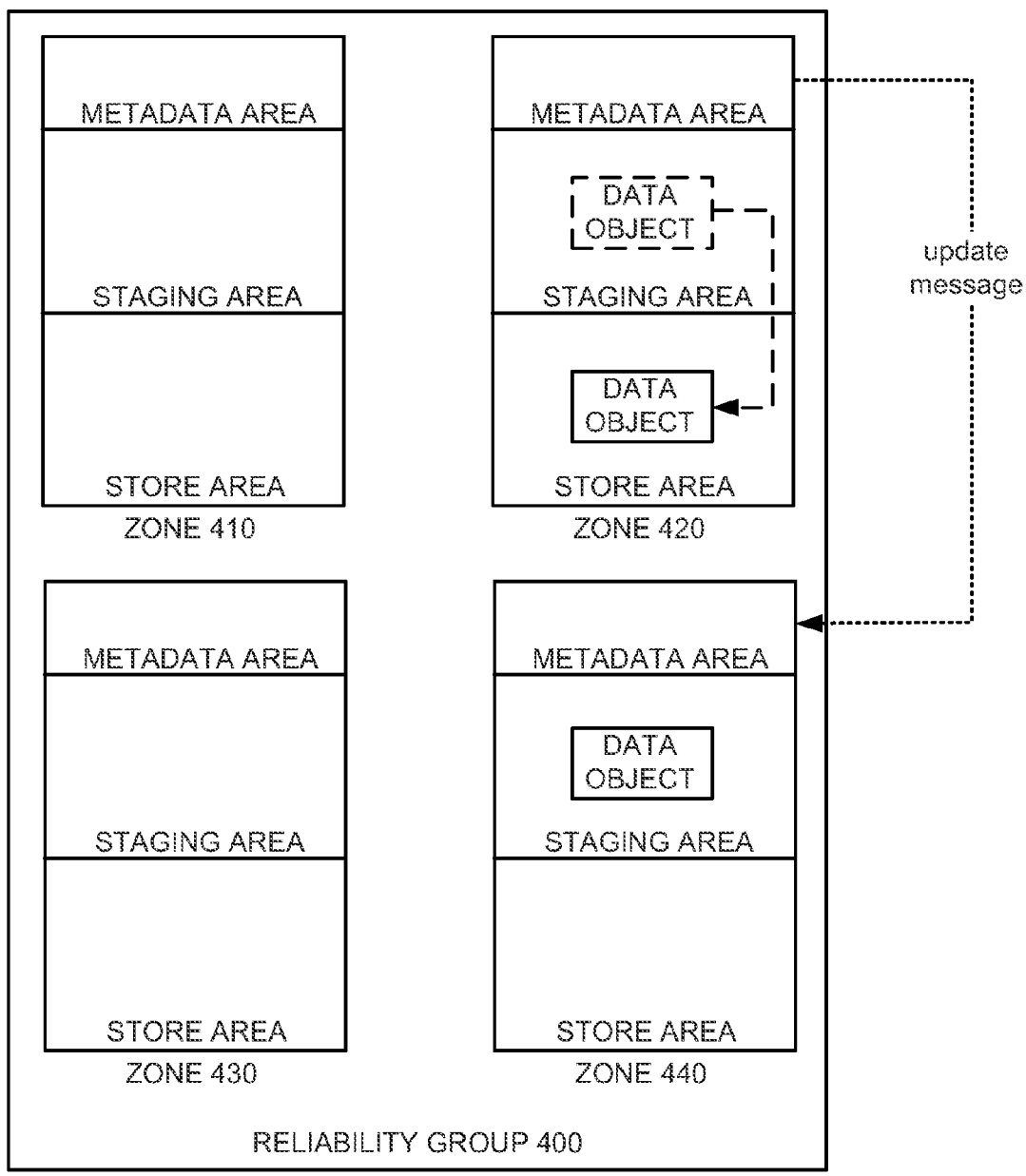
FIG. 4B illustrates an example of a data reliability group after a data object is committed to storage in a reliability group in accordance with some embodiments of the disclosed techniques.

FIG. 4B illustrates reliability group 400 after the data object has been updated in zone 420. When the data object is updated, or destaged, in zone 420 it is written to the store area of zone 420 and the metadata area is updated to reflect the status and storage location of the data object within zone 420. The data object is also typically removed or deleted from the staging area. In conjunction with the destaging of the data object in zone 420, an update message is sent to zone 440 indicating that the data object has been destaged in a zone 420. Zone 440 uses the information in this update message to determine its own state relative to the state of zone 420. A determination regarding what combination of information from the staging areas and store areas of the zones is made based on the update state of zone 420 relative to the update stated of zone 440. For example, if an error occurred after zone 420 had destaged the data object but before zone 440 had updated the associated checksum information in the store area of zone 440, an attempt to recover from the error may require use of information in the staging area of zone 440 rather than simply using the completed checksum information from the store area of zone 440 as would be done using traditional methods.

As illustrated in FIG. 4B, the data object has been destaged in zone 420 even though there has been no coordination as to whether zone 440 is ready to process the data object to generate and/or store the associated checksum data. In other words, the destaging of the data object in zone 420 has been decoupled from the operations performed on the data object in zone 440. Zone 440 will eventually process the data object to produce and/or update checksum information stored in the store area of zone 440, but the updating of zone 420 is no longer dependent upon whether zone 440 is ready to make the update in lockstep. Similarly, if zone 440 is ready to make an update but zone 420 is not, zone 440 can make the update without waiting for zone 420.

Figure 5A:
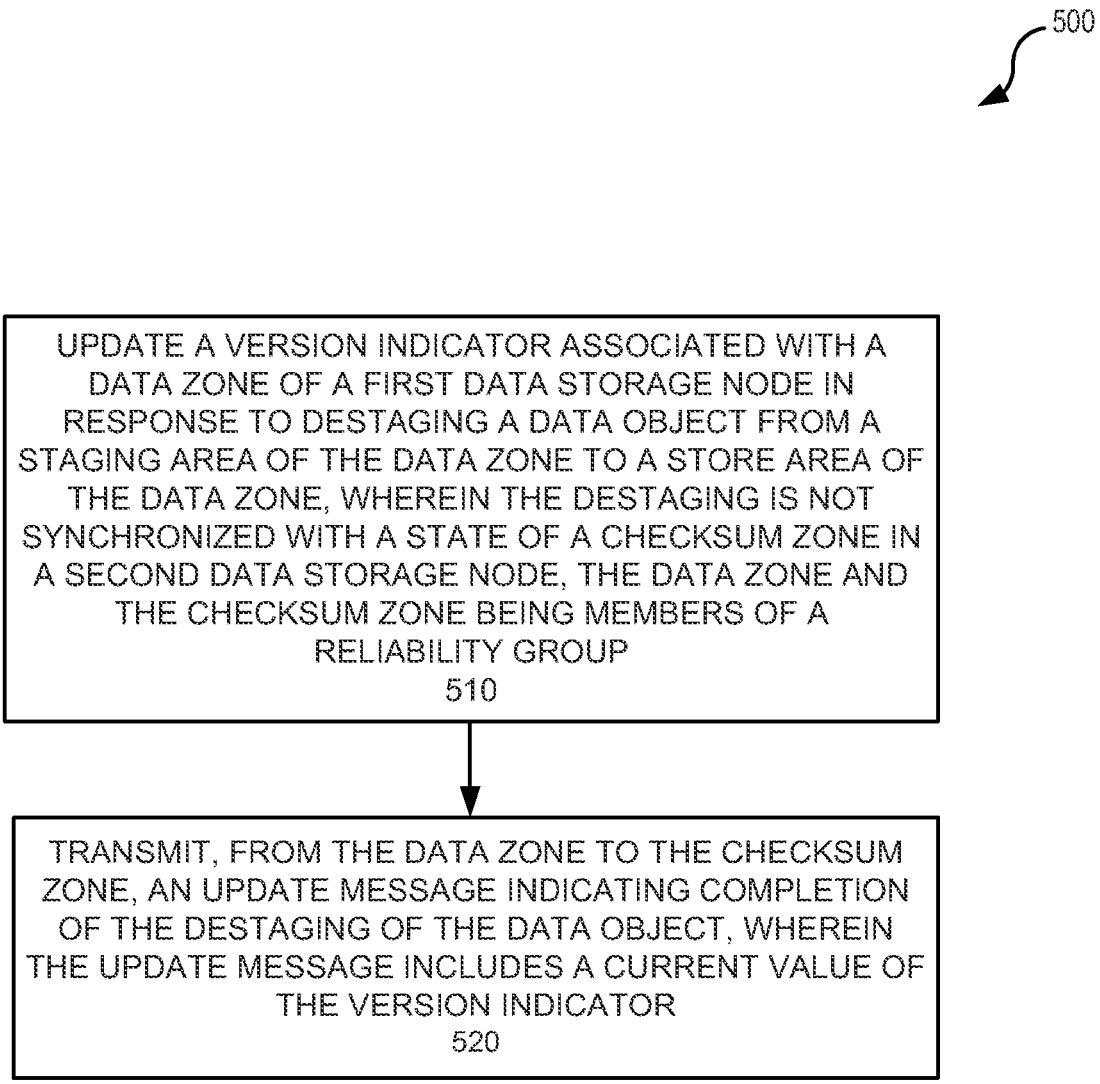
FIG. 5A illustrates a method of performing updates in a data storage reliability group.

FIG. 5A illustrates method 500 of performing updates in a data storage reliability group in an embodiment of the disclosed techniques. Method 500 is described with respect to reliability group 400 of FIGS. 4A and 4B. However, method 500 could be used with other reliability groups in storage clusters such as storage cluster 130 or storage cluster 300. For purposes of explanation, it is assumed that zone 420 is in node 320 of FIG. 3 and zone 440 is in node 340 of FIG. 3.

Method 500 includes updating a version counter associated with zone 420 of data storage node 320 in response to destaging the data object from the staging area of zone 420 to the store area of zone 420 (step 510). As illustrated in FIG. 4B, the destaging is not synchronized with a state of zone 440 of data storage node 340. The method also includes transmitting, from zone 420 to zone 440, an update message indicating completion of the destaging of the data object (step 520). The update message includes a current value of the version counter. The current value of the version counter enables zone 440 to determine or track its own state and update activities relative to zone 420, and potentially other zones. If an error occurs and checksum information is needed from zone 440, the version counter can be used to determine how data in the store area and/or the staging area of zone 440 should be combined, if at all, with data in the staging area and/or the store area of zone 420 for reconstruction. In some cases, the update message transmitted from zone 420 to zone 440 may indicate intent to destage the data object and may be sent before the destaging is complete.

Figure 5B:
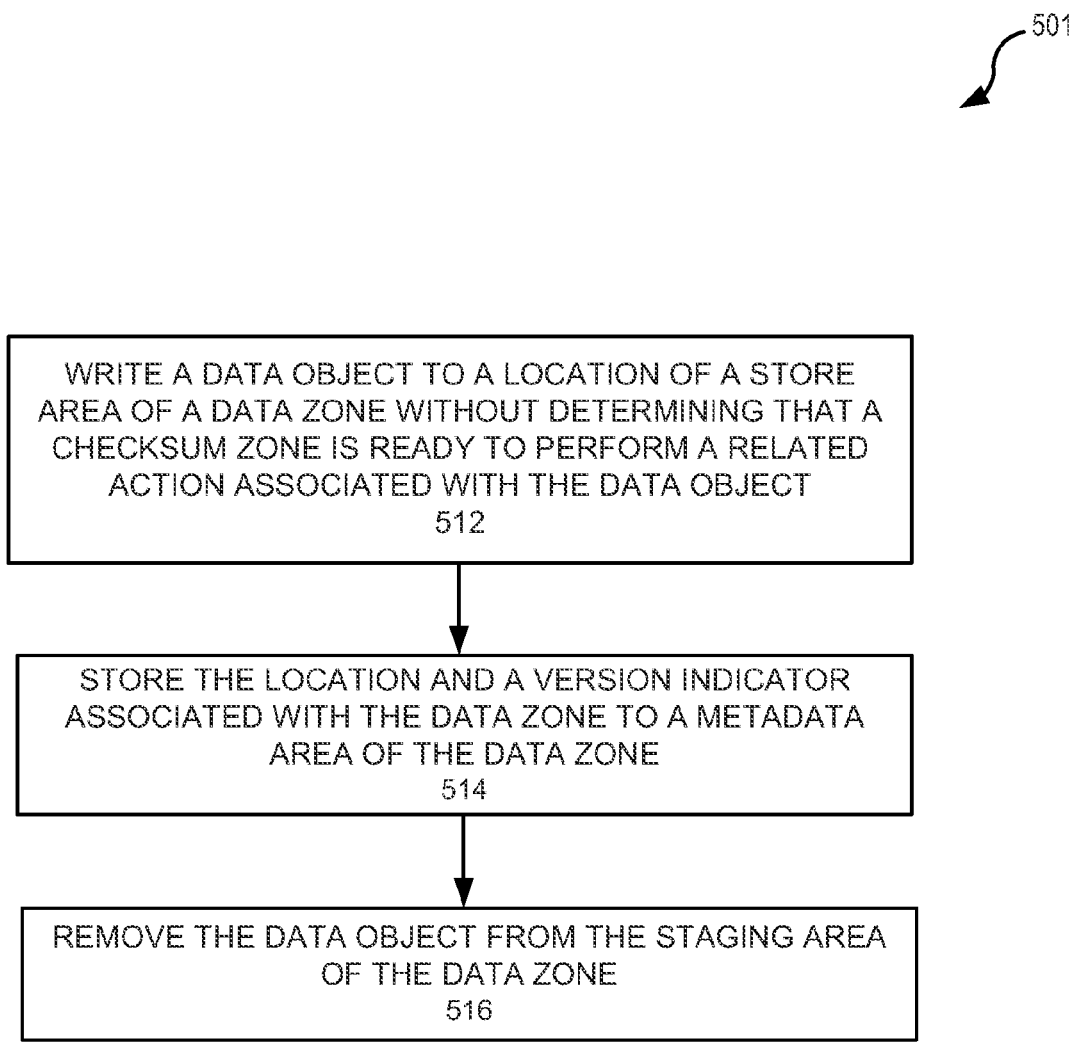
FIG. 5B illustrates a method of destaging a data object.

FIG. 5B illustrates method 501 of destaging a data object. Method 501 is one example of the destaging performed in step 510 of FIG. 5A. Other methods of destaging data objects are possible.

Method 501 includes writing a data object to a location of a store area of a data zone without determining that an associated checksum zone is ready to perform a related action associated with the data object, such as being ready to update a checksum value associated with the data object (step 512). Method 501 also includes storing the location and a version indicator associated with the data zone to a metadata area of the data zone (step 514) and removing the data object from the staging area of the data zone (step 516).

Figure 6A:
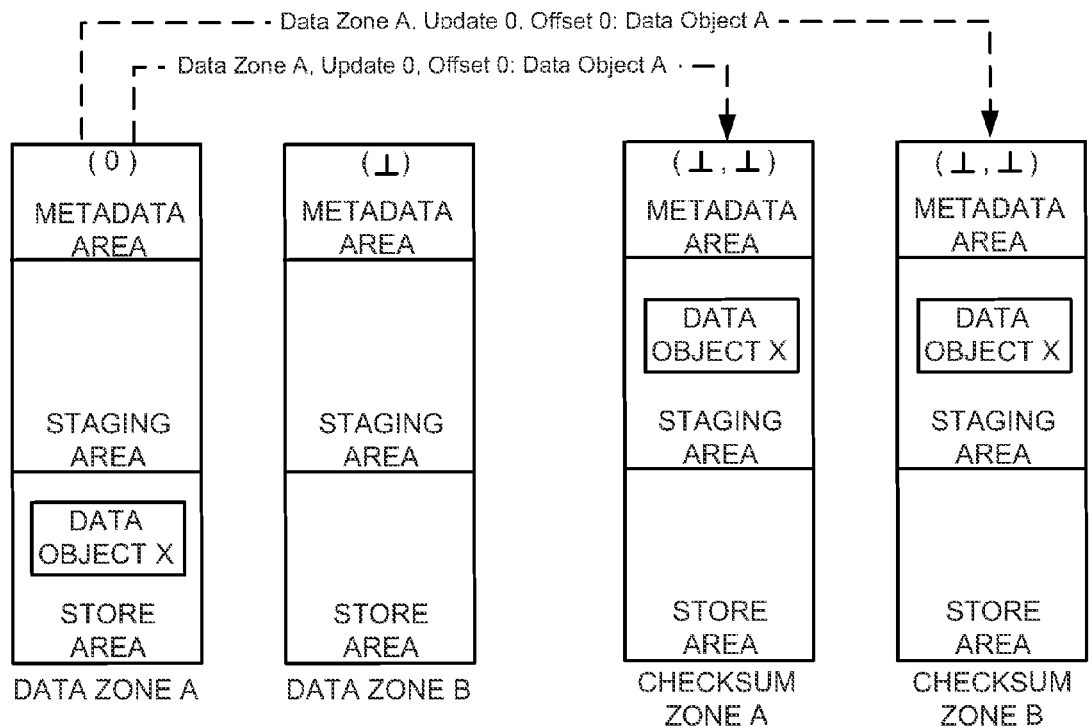
FIG. 6A illustrates updating of data zones and checksum zones of a reliability group in an embodiment of the disclosed techniques.

FIG. 6A illustrates updating of a data zone and checksum zones of a reliability group in an embodiment of the disclosed techniques. In the example of FIG. 6A, a reliability group includes data zone A, data zone B, checksum zone A, and checksum zone B. As in previous examples, each of the data zones and the checksum zones includes a metadata area, a staging area, and a store area. The metadata area is used for, among other things, maintaining a version counter associated with data objects stored in the data zones. The data reliability algorithm used in FIG. 6A involves use of two checksum zones with each data zone. However, the techniques disclosed herein are not to be limited to any particular reliability algorithm and any combination of data zones and checksum zones may be paired to implement a variety of different reliability algorithms.

The first time a data object is written to a data zone, a version counter is updated to a value of 0. The version counter is incremented for each successive update of the data object in the store area of the data zone. Before a data object is written to a data zone for the first time, the version counter has an undefined value which is indicated as 1' (i.e., data zone B). Prior to data object X being written to data zone A, the version counter in the metadata area of data zone A has a value of ±. When data object X was initially received at data zone A, data object X was stored in the staging area of data zone A. At that time, data object X was also replicated to the associated checksum zones, checksum zone A and checksum zone B.

When data object X is destaged from the staging area of data zone A and stored in the store area of data zone A, the version counter was updated to a value of 0. In conjunction with the destaging, an update message is sent to each of the checksum zones. The update message indicates that data object X has been updated for the first time in data zone A at offset 0. The update message may also include other information such as an update time, an object id, and/or an offset.

Each of checksum zone A and checksum zone B maintain a contribution vector in the metadata area. The contribution vector in each checksum zone contains at least one element for each of the associated checksum zones. For example, each of checksum zone A and checksum B has a two element contribution vector where the first element is associated with data zone A and the second element is associated with data zone B. Each contribution vector indicates the status of its checksum zone with respect to each of its associated data zones. For example, in FIG. 6A, the contribution vector of each checksum zones initially has a value of ±, ±. Even though data object X has been replicated to the staging area of each of the checksum zones, checksum information associated with data object X has not yet been created or updated in the store area of the checksum zones. Therefore, the values of the contribution vector elements in each of the checksum zones remain at ±.

The update messages received from the data zones by the checksum zones include a value of the version counter associated with the data zone that is sending the update message. In FIG. 6A, the update messages include the update value of 0 reflecting the transition of the version counter from 0 to ± in the metadata area of data zone A.

When the update message is received at the checksum zone, the checksum zone is able to determine the status of its update processes relative to the data zone. For example, the update value of 0 that is received by checksum zone B from data zone A can be compared to the element of the contribution vector associated with data zone A to determine if there are prior updates associated with data zone A or data object X that have not yet been processed. In this case, the received update value is 0 and the associated element of each contribution of vector is ±. Based on this, a determination can be made that checksum zone B is one update behind data zone A and has a same update status as data zone B.

In some cases, a data zone may process (i.e., destage) multiple data objects to the store area of the data zone before the associated checksum zone(s) have processed any of those data object updates. In this case, the checksum zone(s) may have multiple data objects in their staging areas and the difference between the value of the data zone's version counter and associated element of the contribution vector in the checksum zone(s) may be greater than 1. This situation is permitted because the update operations in the checksum zones have been decoupled from the update operations in the data zones. In some cases, processing of multiple data object in a checksum zone enables the checksum zone to make full stripe writes and avoid penalties associated with having to read, modify, and rewrite data.

Figure 6B:
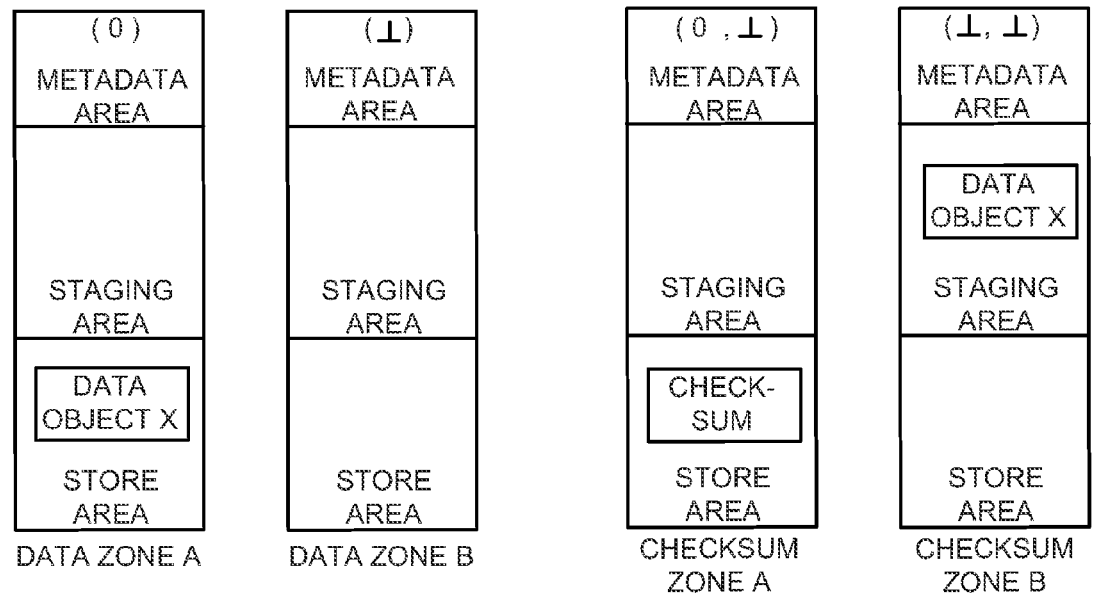
FIG. 6B illustrates updating of data zones and checksum zones of a reliability group in an embodiment of the disclosed techniques.

FIG. 6B illustrates updating of the data zones and checksum zones of the reliability group of FIG. 6A in an embodiment of the disclosed techniques. In FIG. 6B, checksum zone A has processed data object X, that was previously in the staging area of checksum zone A, to produce or update a checksum value in the store area of checksum zone A. Once this is complete checksum zone A no longer needs data object X and it is deleted from the staging area. In addition, the element of checksum zone A's contribution vector associated with data zone A is incremented to have a value of 0. At this point in time, the version counter in data zone A and the associated element of the contribution vector in checksum zone A have the same value. If an error occurred and the checksum information from checksum zone A was needed to recover data object X, the fact that the contribution vector and the version counter of data zone A have the same value indicates that the checksum value in checksum zone A is up to date with respect to the store area of data zone A.

In contrast to checksum zone A, at the point in time illustrated in FIG. 6B, checksum zone B has not yet created or updated a checksum value in its store area with respect to data zone A or data zone B. This state demonstrates not only that the updating of a checksum zone is decoupled from the updating of the associated data zone, as discussed above, but also that the updating of two or more checksum zones that are associated with the same data zone can also be decoupled. In other words, in FIG. 6B, checksum zone A has been updated based on the update to data zone A illustrated in FIG. 6A, but checksum zone B has not. Because checksum zone B has not yet been updated, its contribution vector still has a value of ±, ±.

Figure 6C:
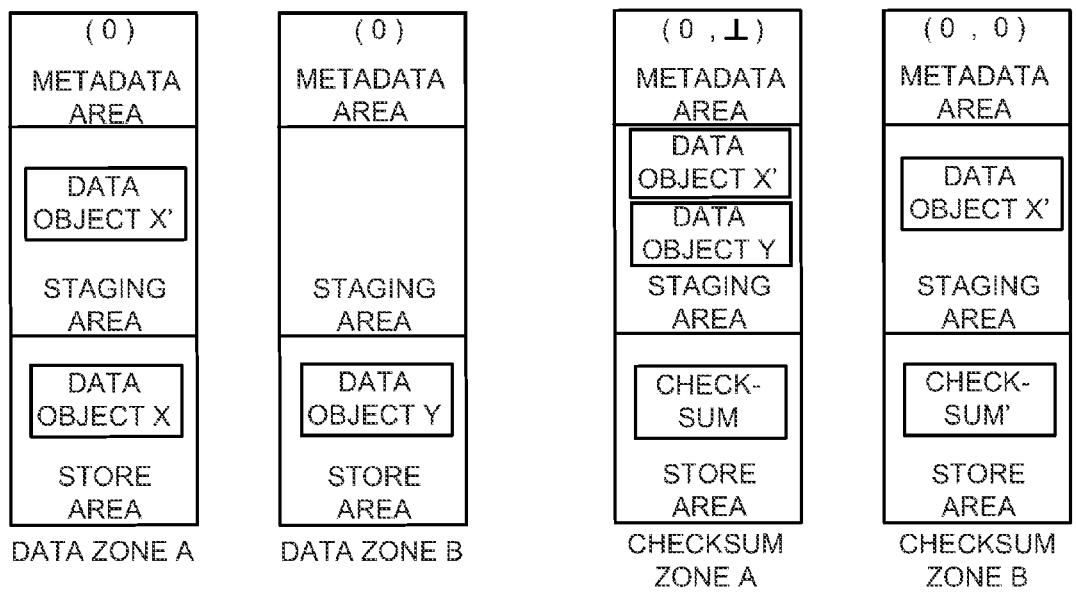
FIG. 6C illustrates updating of data zones and checksum zones of a reliability group in an embodiment of the disclosed techniques.

FIG. 6C illustrates further updating of the data zones and checksum zones of the reliability group of FIGS. 6A and 6B in an embodiment of the disclosed techniques. Several events have occurred in FIG. 6C since the state illustrated by FIG. 6B.

First, checksum zone B has processed data object X that was in the staging area of checksum zone B and updated the checksum value in the store area of checksum zone B. This is reflected in the updating of the second value of the contribution vector from ± to 0. This process is similar to the process that occurred in checksum zone A in the transition from FIG. 6A to FIG. 6B.

Second, data object Y has been written to data zone B. While data object Y was originally stored to the staging area of data zone B, in FIG. 6C it has already been destaged and written to the store area of data zone B. Consequently, the version counter associated with data zone B has been incremented from ± to 0. In conjunction, an update message was sent from data zone B to each of checksum zone A and checksum B indicating that the data object Y was destaged in data zone B. In checksum zone A, data object Y is stored in the staging area waiting for processing. Because it has not yet been processed, the value of the contribution vector in checksum zone A associated with data zone B still has a value of ±. Checksum zone B also initially stored data object Y in its own staging area when data object Y was received. However, in FIG. 6C, checksum zone B has already processed data object Y and updated the checksum information in the store area of checksum zone B accordingly. Consequently, the element of checksum zone B's contribution vector associated with data zone B has been incremented from 0 to ±. In FIG. 6C, the checksum value in the store area of checksum zone B includes checksum information associated with data object X of data zone A and data object Y of data zone B.

FIG. 6C also illustrates occurrence of a third event since the state illustrated in FIG. 6B. Data zone A has received an update to data object X that is represented as data object X'. Data object X' has not yet been destaged to the store area of data zone A and remains in the staging area of data zone A. Consequently, the version counter of data zone A has not been incremented again and still has a value of 0. Data object X' has already been replicated to the staging area of each of the checksum zones. Because neither of the checksum zones has processed data object X', both contribution vector elements associated with data zone A still have a value of 0.

Figure 6D:
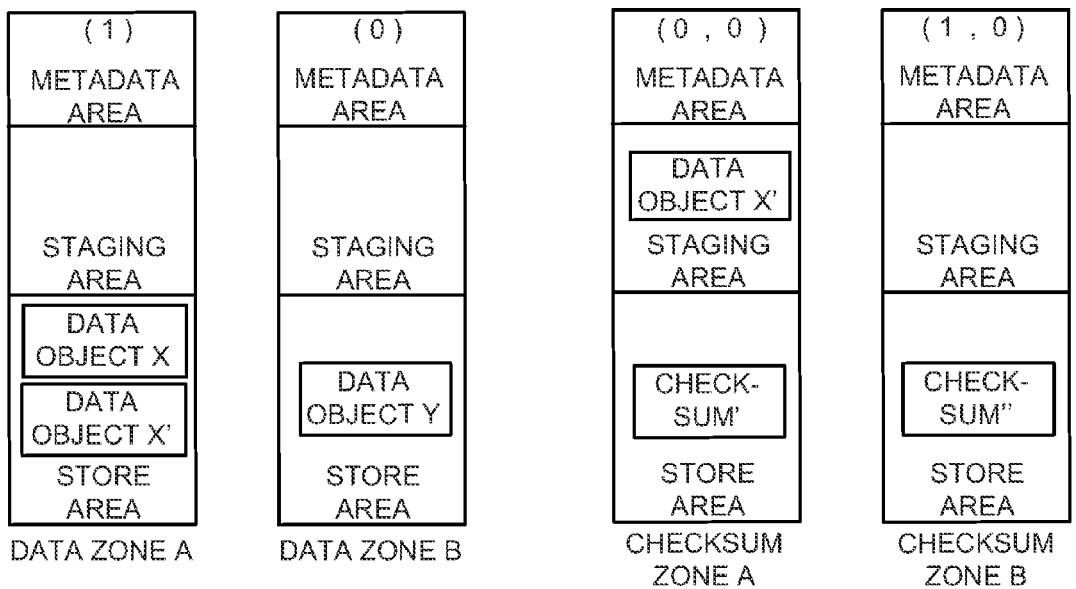
FIG. 6D illustrates updating of data zones and checksum zones of a reliability group in an embodiment of the disclosed techniques.

FIG. 6D illustrates further updating of the data zones and checksum zones of the reliability group of FIGS. 6A, 6B, and 6C in an embodiment of the disclosed techniques. Several events have occurred since the state represented in FIG. 6C. First, data zone A has processed data object X' and written it to the store area. As a result, data zone A's version counter has been incremented from a value of 0 to a value of 1. As illustrated, the store area of data zone A is written in a log format such that data object X is not written over by the updated version, data object X'. This approach means that prior versions of a data object are still available in a data zone after it has been updated to a new version. Among other reasons, this feature is useful in various approaches to zone reconstruction which are discussed in detail below.

Second, checksum zone A has processed data object Y, which was previously in the staging area of checksum zone A. The checksum value in the store area of checksum zone A has been updated based on this processing and the element of checksum zone A's contribution vector associated with data zone B has been incremented from ± to 0. This element of the contribution now has the same value as the version counter of data zone B because both are at the same update level and both have processed all pending data objects.

A third event has also occurred in FIG. 6D since the state illustrated in FIG. 6C. Checksum zone B has processed data object X' which was previously stored in the staging area of checksum zone B. The checksum value in the store area of checksum zone B is updated based on the processing of data object X'. This is represented by the checksum value in the store changing from checksum' to checksum". Data object X' is discarded from the staging area of checksum zone B once this process is complete. In conjunction, the element of checksum zone B's contribution vector associated with data zone A is incremented from 0 to 1.

If an error or failure affected data zone A at the point in time illustrated by FIG. 6D, recovery of data zone A is possible even though both checksum zones have not been updated with respect to data object X'. When this error occurs, the version counter associated with data zone A indicates that data zone A was at revision 1 when the error occurred. The associated element of the contribution vector of checksum B indicates that zone B is up to date with respect to data zone A and the checksum" information from the store area of checksum B can be used in the recovery process. However, the contribution vector of checksum zone A indicates that checksum zone A is 'behind' data zone A in the sense that it is still at revision 0 with respect to data zone A. Consequently, use of the checksum' information from the store area of checksum zone A would likely produce an erroneous result because that checksum information is not based on or updated with respect to data object X'. However, data object X' is still available in the staging area of checksum zone A and can be used in the recovery of data zone A.

In the examples of FIGS. 6A-6D, each of checksum zones A and B is illustrated as having a single checksum value associated with multiple data objects. However, other checksum algorithms and methods are possible. For example, separate checksum values may be associated with each of the data objects. In addition, each checksum zone may have a plurality of checksum values each being associated with two or more data objects. The techniques disclosed herein are not to be limited to any particular checksum algorithm or method and may also include data associated with other types of data reliability schemes such as cyclic redundancy checks, hash values, or other types of error correcting codes.

Figure 7:
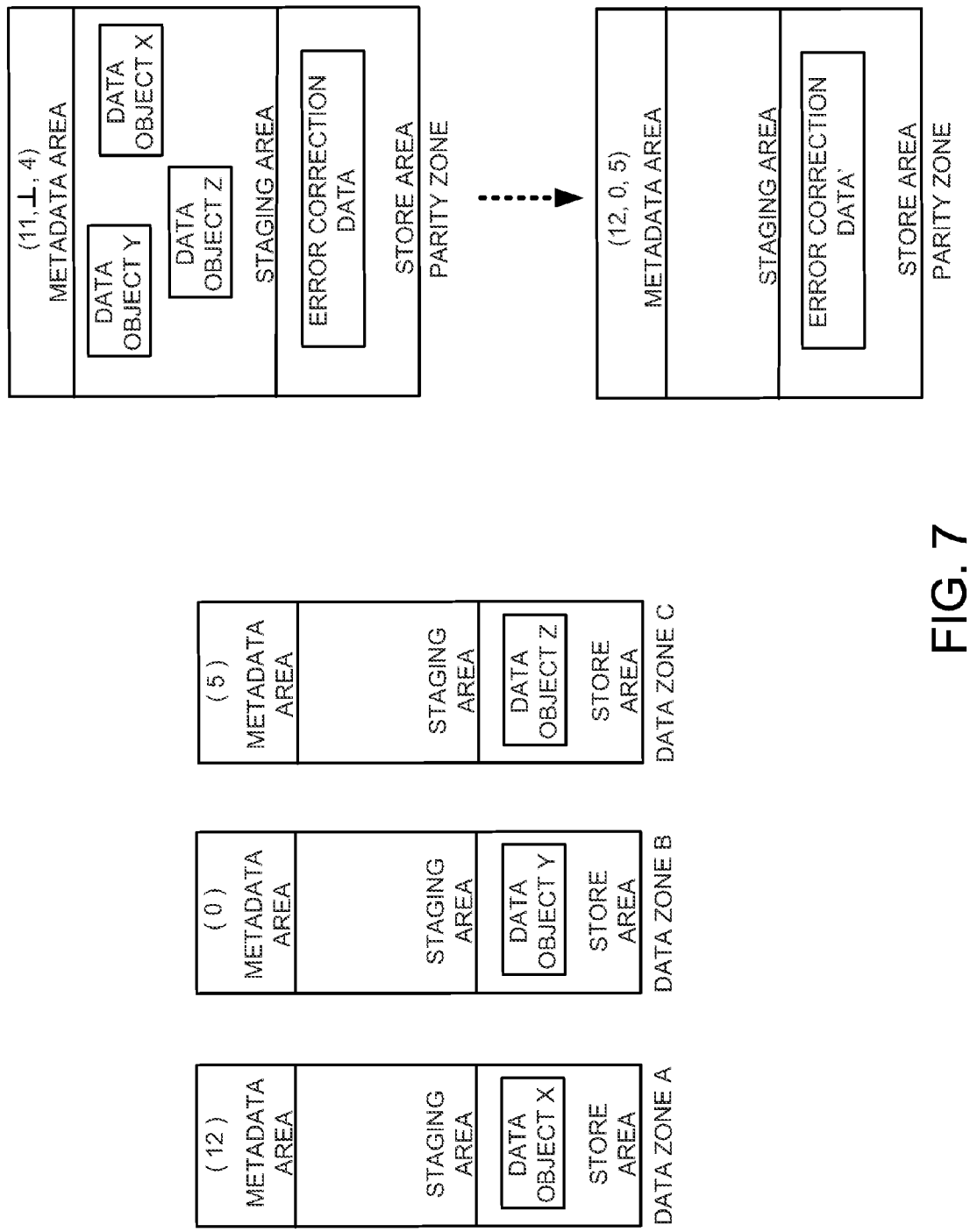
FIG. 7 illustrates updating of multiple data zones and a checksum zones of a reliability group in an embodiment of the disclosed techniques.

FIG. 7 illustrates updating of data zones and checksum zones of a reliability group in an embodiment of the disclosed techniques. In the example of FIG. 7, three data zones and a single parity zone make up a reliability group. Each of the three data zones have a different data object stored in their respective store area. Many additional data objects are possible. After being received at the data zones, the data objects were also replicated to the parity zone and stored in the staging area of the parity zone. As in previous examples, these data objects were initially stored in the staging area of their respective data zones before being processed, or destaged, by the respective data zone. As in the examples of FIGS. 6A-6D, each of the data zones has a version counter indicating how many times it has been updated. For example, when data object X was stored to the store area of data zone A, it was the 13th update to data zone A and the version counter was incremented from 11 to 12.

As in previous examples, when the data objects are staged in the staging area of the parity zone, they have not yet been processed. Therefore, the values in the contribution vector associated with each of the data zones have not been incremented even though the data objects have been received by the parity zone. For example, the element of the contribution vector associated with data zone A has a value of 11 indicating that the error correction data in the store area of the parity zone has been updated to only update 11 of data zone A. Similarly, because the element of the contribution vector associated with data zone B has a value of ±, the error correction data has not been updated with respect to data zone B and does not contain any information associated with the updates to data zone B. As in previous examples, the destaging of the data objects in the data zones is decoupled from the updating of the error correction information in the parity zone. Data zones A-C are permitted to destage their respective data objects without determining that the parity zone is ready to perform an associated destaging process and without having to perform the destaging in lockstep with the parity zone as would be required in a system using a multi-phase commit protocol. In some cases, a data object may not be removed or cleared from the staging area of a zone until all members of the reliability group have completed processing of staged data objects.

In FIG. 7, when the data objects in the staging area of the parity zone are processed, the error correction data is updated with information associated with all three data objects resulting in error correction information'. Once this process is complete, the data objects are released from the staging area of the parity zone. Also, the elements of the contribution vector associated with each of the data zones are incremented to reflect the update of the parity information. As described above, the parity zone is able to update the error correction data on its own schedule because the timing of the updates in the data zones has been decoupled from the updates in the parity zone. However, the relative revision stage of the parity zone with respect to each of the data zones is tracked such that recovery or reconstruction activities associated with a failure can take place even though the parity zone may not be at the same update level as one or more of the data zones.

In the example of FIG. 7, all three data objects are processed in the parity zone in a single step. It should be understood that each of the data objects may be processed by the parity zone individually or in sub-groups. The number of data objects included a sub-group may be selected such to optimize write processes. For example, the number of data objects to process in a single step may be selected such that the resulting error correction data occupies a full stripe. In addition, although the three data zones of FIG. 7 are illustrated as each having destaged a data object, the data zones may receive and destage data objects at various times independent of each other. In addition, the parity zone may be associated with additional data zones which are not illustrated in FIG. 7.

The various methods of performing updates in a reliability group disclosed herein may be used in conjunction with a variety of data reliability algorithms or methods. In some cases, the techniques described herein may be described as 'eventual consistency' techniques because the updating of the parity and/or checksum values in the checksum and/or parity nodes is not performed in lockstep with updates in the data nodes. Although the updates in the parity and/or checksum nodes are decoupled they will 'eventually' become consistent with data nodes after the parity/checksum nodes have processed the data objects on their own schedule.

In the data storage systems described herein, data reconstruction in response to a node failure, zone failure, or other type of error may occur in a number of different ways depending on the configuration of the system, the nature of the failure, and the state of the system when the failure occurred. One dimension that may be considered when scheduling data reconstruction is the number of zones required to perform the reconstruction. For example, if the system configuration is such that there are n data zones and two checksum zones in the reliability group, a single zone failure may mean the system can recover using n of the remaining n+1 remaining zones. In this case, n of the remaining n+1 zones may be at the same version even though the one other zone is not at that version number.

Recovery may be undertaken using those n zones without having to make use of the one zone that is not at the current version number and take the additional steps necessary when recovering using a zone that is not at the current version number.

Another dimension that may be considered in determining how a recovery activity will be undertaken is the state of the contribution vector of one or more of the checksum zones. If a checksum zone is not up to date with one or more of the data zones (i.e., is 'behind' in its processing) and is still operating correctly, the system may wait for the checksum zone to complete the pending processing and get up to date before the recover activities start.

Another dimension that may be considered in determining how a system will recover from an error scenario is the version or update state of one or more of the data zones. If the data zones are updated in a log fashion, the system may have two options for how the data zone will be taken into account in the reconstruction. First, after an error has occurred, the system may wait for a data zone to complete any pending updates to reach a current version or to reach a specified version. Alternately, if the data zone maintains metadata allowing it to distinguish the bounds of each update it has made, or at least some specified number of recent updates, it may be able to provide data for any arbitrary version, up to its current version. If the data zone is operated using a write anywhere file layout (WAFL) methodology, or another similar methodology where updates are written to new physical storage locations, the data zone may access various versions of its contents by using the different versions of data stored at successive offsets as snapshots of the data at the times associated with those offsets.

Figure 8:
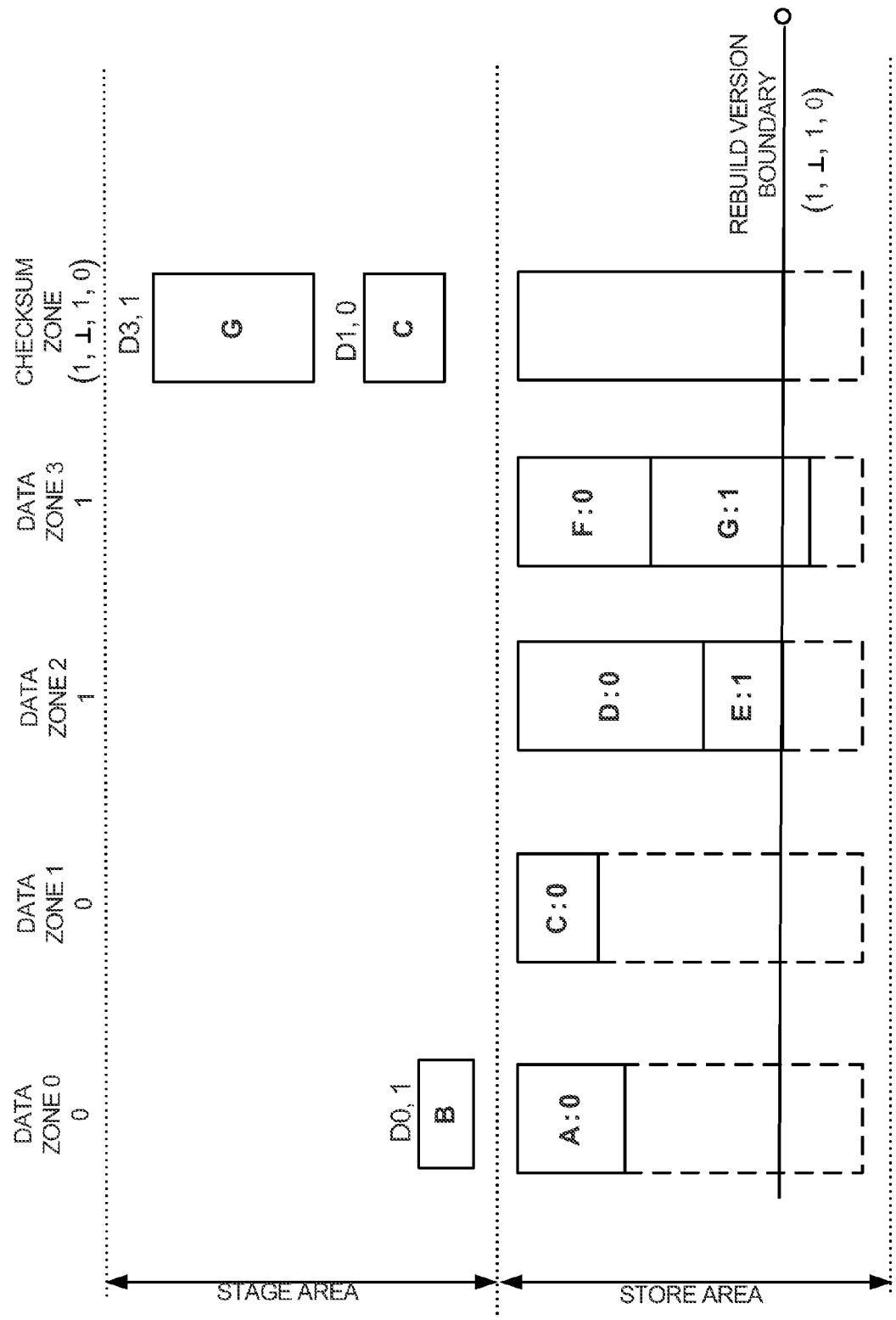
FIG. 8 illustrates recovery from a reliability group failure in an embodiment of the disclosed techniques.

FIG. 8 illustrates a recovery scenario for a reliability group in an embodiment of the disclosed techniques. The reliability group of FIG. 8 is configured as a simple RAID 4 reliability group with an XOR parity scheme. The RAID 4 reliability group includes 4 data zones and 1 checksum zone. Each of the data zones may have a layer of local RAID such that individual media or drive failures within a zone can be handled within the zone and without invoking the capabilities of the reliability group. The example discussed with respect to FIG. 8 is primarily focused at recovering from a failure in which the entire node on which a zone resides fails or a failure of a significant portion of the node such that the zone cannot be recovered using other tools, techniques, or data within the affected node.

In FIG. 8, the dashed lines associated with each data zone illustrate the extent of each data zone, respectively, while the solid lines show the boundary of log-style writes that have been made in store areas of the data zones. For example data object C has been written, or destaged, as update 0 to the store area of data zone 1 and data object E has been written as update 1 to the store area of data zone 2. While data object A has been stored in the storage area of data zone 0, data zone 0 also has another data object, data object B, which is in the staging area of data zone 0. Data objects C and G have been replicated to the staging area of the checksum zone, but have not yet been processed. Therefore, the version counter of data zone 1 has a value of 0 but the corresponding element of the checksum zone's contribution vector is ±. Similarly, data zone 3 has a current version of 1, but the corresponding element of the contribution vector in the checksum zone has a value of 0 because data object G has not been processed by the checksum zone.

In some cases, destaging in the data zone may lag the processing in the checksum zone. For example, while data object B is still in the staging area of data zone 0, it has already been processed in the checksum zone. This is indicated by the fact that the element of the contribution vector in the checksum zone corresponding to data zone 0 has a value of 1 even though data zone 0 has a current version of 0 (with data object B being the update associated with version 1 that has already been processed in the checksum zone).

Upon a failure, a simple reconstruction approach might be to continue processing all of the pending data zone updates, such as data object B, before attempting to reconstruct. However, there may be problems with this approach. First, performance and reliability may suffer if there are a large number of outstanding pending writes because the system must wait until they are complete to start the recovery process. Second, the slowest of these nodes will dictate when reconstruction can begin for the entire reliability group. Third, the data zones cannot continue accepting new data objects during the reconstruction period if the staging areas are expected to be clear for recovery operations to take place.

The problems described above can be remedied using the reconstruction algorithm described below. In the RAID-4 XOR parity system illustrated, there are two possible rebuild scenarios. Rebuild a checksum zone using all of the data zones or rebuild a data zone using the remaining data zones and the checksum zone. This is due to the fact that a single XOR parity arrangement can only survive a single node failure.

In the case of rebuilding a data zone, the algorithm proceeds in three primary phases: 1) setting the reconstruction boundary and updating any participating data zone; 2) recovering data in the zone store; and 3) recovering data in the zone stage area. Each of these steps is discussed in detail below.

The first step in reconstruction example of FIG. 8 is to determine how much of the zone is to be recovered from the zone store areas and how much is to be recovered using the staging areas. This is referred to as the rebuild version boundary. Data before the rebuild version boundary is recovered using the store area and data after the rebuild version boundary is recovered from staged replicas of the data objects. Because data zones are written in log fashion, a data zone at a version v can provide the zone store contents for any version from 0 to i, where i<=v, because new updates do not overwrite old updates. In contrast, a checksum zone is typically updated in place. Therefore, new checksum updates typically overwrite old update. As a result, in a single parity checksum zone reliability group, the rebuild boundary for recovery is determined by the checksum zone's contribution vector.

Once the rebuild boundary is established, the participation of each of the data zones involved in the reconstruction is determined based on the rebuild version boundary. There are three scenarios which must be considered in how a data zone will participate in the reconstruction. The scenarios vary depending on the current version of the data zone relative to the rebuild boundary. First, the data zone version may be less than the rebuild boundary version. In this case, that data zone must commit any pending updates until its version is at least equal to that of the checksum zone. For example, in FIG. 8, data zone 0 would need to process update 1 (i.e., process data object B) in order to participate in the reconstruction. In the second scenario, the data zone could be at the same version as the rebuild boundary (i.e., data zone 2). In this case, the data zone can provide all of its data to the reconstruction based on its current state. In a third scenario, the data zone can be at a greater version than the rebuild boundary (i.e., data zone 3). In this case, the data zone will provide its data only up to the version associated with the version of the rebuild boundary. For example, data zone 3 will only provide its update 0 to the reconstruction effort (i.e., provide object F and not object G).

The second step in this reconstruction is recovering the data in the selected data zone store areas. In the case of RAID-4 style XOR parity, data is combined at the reconstructed zone by XORing data from each participating zone and writing out the result. Recovery starts at the beginning of the data zone store and continues up to the rebuild boundary. All data between the boundary of the data zone's contribution and the rebuild boundary is assumed to be logically zero. For example, since data zone 3 is only participating up to version to 0, it would report anything after the end of update 0 as being zero.

The third step in this reconstruction is to populate the recovered zone's staging area. In this step, checksum zone examines its own staging area and determines if it is holding any data objects associated with the data zone being recovered. These data objects, if any, are replicated to staging area of the recovered data zone. In the above example, if data zone 1 is being recovered, the checksum zone would replicate object C to the staging area of recovered data zone 1. In some cases, this third step may occur in parallel with the second step described above.

In the case of rebuilding a lost checksum zone, the reconstruction algorithm has the following three primary steps: 1) establishing the rebuild version boundary based on the versions of each of the data zones; 2) recovering the checksum zone by reconstructing the parity; and 3) replicating staged objects from the data zone to the checksum zone's stage area. In the RAID-4 XOR parity case, reconstructing the lost parity zone is simpler than reconstructing a data zone if the data zones are all written log style.

As with reconstructing a data zone, the first step in reconstructing checksum zone is establishing the rebuild version boundary. The rebuild version boundary is established by determining the current version of each data zone. Logically, the data zone with the largest final offset dictates the rebuild version boundary. Once the rebuild version boundary is established, the second step is to reconstruct the parity information by collecting the data from each data zone up to the rebuild version boundary. This includes data objects up to that rebuild boundary and logical zeros for any offsets beyond the data zone's own individual version. For example, in FIG. 8, data zone 1 will contribute its contents up through data object A, but will contribute logical zero from the end of object A up to the rebuild version boundary. In one embodiment, the data zone can transmit a message indicating that everything past object A is logical zero rather than actually sending the entire string of logical zeros.

The third step is to replicate the staged objects, if any, from the data zones to the stage area of the checksum zone. As in the case of reconstructing a data zone, this step may be performed in parallel with the second step above.

The example of FIG. 8 discussed above pertains to reconstruction of a zone in an n+1 RAID-4 configured system. The discussion below provides a description of how these techniques may be adapted for use in a system with an arbitrary number of checksum elements, m, as may be used in a system using Reed Solomon encoding. For example, a 4+2 reliability group having 4 data zones and 2 checksum zones. As in the RAID-4 example, each data zone may have its own local layer of local RAID enabling it to individually recover from a media failure within the zone. This discussion is primarily focused toward node failures which cannot be handled by the node or internally with a data zone.

In Reed Solomon encoding, a matrix (F) is used to generate m checksum symbols (C) from n data symbols (D). This relationship can be summarized as FD=C. The benefit of this approach is that the checksum symbols are calculated over data symbols rather than over data symbols and checksum symbols (such as in row-diagonal parity). Thus, each checksum zone can make progress on data zone store updates independently of the other checksum zones. In addition, when a data symbol changes from d to d', each of the checksum symbols is updated subtracting out the old data value, d, from the checksum and adding in the new value, d'. If writes are constrained to a single data zone and writes to data zones are performed in a log fashion, it can be assumed that d is 0 for all updates d' and there is no need to involve more than a single data zone and the checksum zones for each update.

Reconstruction in the Reed Solomon case can be broken down into four fundamental phases: 1) determining the rebuild boundary version; 2) updating the zones up to a minimum of the rebuild boundary version; 3) recovering the data in the zone store; and 4) recovering the data in the zone stage. These four phases are discussed in more detail below.

The rebuild begins by collecting the contribution vectors from all of the zones that will participate in reconstruction. The rebuild boundary version is determined based on the contribution vectors returned by these participating zones. If there are one or more checksum zones in the group of participating zones, the rebuild version boundary version is based on the maximum version number of the participating checksum zones. For example, if there are two participating checksum zones, and their versions are (5, 7, 3) and (3, 9, 3), then the rebuild version would be (5, 9, 3). Checksum zones must participate in the maximum possible version because they are updated in place and cannot typically provide access to previous versions because they do not contain a detailed log of all prior checksum updates. If no checksum zones are participating, the rebuild version is based on the maximum version associated with the participating data zones. For example, if data zone 0 is at version 5, data zone 1 is at version 11, and data zone 2 is at version 6, then the rebuild version is (0, 11, 6).

The second phase of recovery involves each zone in the reconstruction set applying the updates needed to reach the appropriate version. Version comparison, version requirements, and update requirements are dependent on whether the participating zone is a data zone or checksum zone. For data zones, version comparison is done by comparing the rebuild contribution vector and the data zone's vector at the specific offset of that zone in the reliability group. This version number must be greater than or equal to the version of the rebuild contribution vector in order to participate in reconstruction. For example, if data zone 0 has an update version of 5, it is compatible with rebuild vectors of (4, 13, 2) or (3, 2, 9), but incompatible with a rebuild vector of (6, 13, 2) or (9, 2, 9). Because data zones are written in a log fashion, they only need to be equal to or greater than the rebuild version because they can participate in reconstruction using any arbitrary prior version.

For checksum zones, version comparison is done by comparing each element of the contribution vector. A checksum version is greater than a rebuild version only if it is greater than the rebuild version for at least one element and is at least equal to the rebuild version for every other element. Because checksum zones are updated in place, all participating checksum zones must be at the same version.

Thus, version requirements are stricter for checksum zones than for data zones. Once the rebuild version has been determined, each checksum zone must apply all outstanding updates required to bring them up to the rebuild version.

The third phase involves recovering the failed zone's data store. This is done using standard Reed Solomon recovery techniques, such as Gaussian Elimination. This phase may proceed in multiple rounds with each round covering a specific byte range. In the case of a complete zone reconstruction, recovery begins at zone offset 0, and proceeds to the end of the rebuild version boundary where the rebuild version boundary is the farthest byte offset, or has the largest byte offset, of the rebuild version.

The fourth phase involves regenerating the staging area of the lost zone. To restore the staging area of a lost checksum zone there are two approaches. The first approach works if there is another checksum zone participating in the reconstruction. The first approach is to replicate the staging area from a participating checksum zone's staging area to the reconstructed zone's staging area. The second approach requires that each of the participating data zones replicate their staging area(s) to the checksum zone and then replicate any data objects which are past the rebuild version. To restore the staging area of a lost data zone, a participating checksum zone can search its staging area for any data objects associated with the data zone being recovered. Since the zone staging area is separate from the zone store area, the fourth phase can occur in parallel with the third phase, described above.

Embodiments of the present techniques include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware.

Embodiments of the techniques introduced here may be provided as a computer program product, which may include a machine-readable medium having stored thereon non-transitory instructions which may be used to program a computer or other electronic device to perform some or all of the operations described herein. The machine-readable medium may include, but is not limited to optical disks, compact disc read-only memories (CD-ROMs), magneto-optical disks, floppy disks, ROMs, random access memories (RAMs), erasable programmable read-only memories (EPROMs), electrically erasable programmable read-only memories (EEPROMs), magnetic or optical cards, flash memory, or other type of machine-readable medium suitable for storing electronic instructions. Moreover, embodiments of the solution introduced here may also be downloaded as a computer program product, wherein the program may be transferred from a remote computer to a requesting computer by way of data signals embodied in a carrier wave or other propagation medium via a communication link.

The phrases "in some embodiments," "according to some embodiments," "in the embodiments shown," "in other embodiments," "the solution," "in some examples," and the like generally mean the particular feature, structure, or characteristic following the phrase is included in at least one embodiment of the solution introduced here, and may be included in more than one embodiment of the solution introduced here. In addition, such phrases do not necessarily refer to the same embodiments or different embodiments.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the solution introduced here is intended to embrace all such alternatives, modifications, and variations as fall within the scope of the claims, together with all equivalents thereof. Therefore, the above description should not be taken as limiting the scope of the invention, which is defined by the claims.

What is claimed is:

1. A data storage device comprising:
one or more processors;
a memory, wherein the memory is coupled to the one or more processors which are configured to execute programmed instructions stored in the memory comprising:
store a data object in a staging area of a data storage zone;
transfer the stored data object to a store area of the data storage zone without establishing a commit protocol with a parity storage zone;
update a revision value associated with the data storage zone in response to the transfer;
identify prior unprocessed updates associated with the data storage zone by comparing the updated revision value to an element of a contribution vector associated with the data storage zone, wherein the identify further comprises determine when information associated with one of the identified prior unprocessed updates is not available in the parity storage zone and request for the information associated with the one of the identified prior unprocessed updates from the data storage zone when the information is determined to be not available;
sequentially generate and store, in a store area of the parity storage zone, checksum information associated with the identified prior unprocessed updates in an order determined based on the updated revision value and revision values of the identified prior unprocessed updates; and
update the element of the contribution vector with the sequentially generated checksum information.

2. The device of claim 1 wherein the checksum information is generated using erasure coding.

3. The device of claim 1 further comprising:
additional data storage zones; and
additional parity storage zones; and
wherein the checksum information is generated based on the data storage zones and the parity zones using Reed Solomon encoding.

4. The device of claim 1 wherein the data object is stored in the store area of the data storage zone in append-only log format.

5. The device of claim 1 wherein the checksum information is stored in the store area of the parity storage zone in-place relative to a prior version of the checksum information.

6. The device of claim 1 further comprises transmit an acknowledgement to the data storage zone in response to receiving the update from the data storage zone.

7. A method comprising:
- storing, by a computing device, a data object in a staging area of a data storage zone;
- transferring, by the computing device, the stored data object to a store area of the data storage zone without establishing a commit protocol with a parity storage zone;
- updating, by the computing device, a revision value associated with the data storage zone in response to the transfer;
- identifying, by the computing device, prior unprocessed updates associated with the data storage zone by comparing the updated revision value to an element of a contribution vector associated with the data storage zone, wherein the identify further comprises determine when information associated with one of the identified prior unprocessed updates is not available in the parity storage zone and request for the information associated with the one of the identified prior unprocessed updates from the data storage zone when the information is determined to be not available;
- sequentially generating and storing, by the computing device, in a store area of the parity storage zone, checksum information associated with the identified prior unprocessed updates in an order determined based on the updated revision value and revision values of the identified prior unprocessed updates; and
- updating, by the computing device, the element of the contribution vector with the sequentially generated checksum information.

8. The method as set forth in claim 7 wherein the checksum information is generated using erasure coding.

9. The method as set forth in claim 7 further comprising:
- additional, by the computing device, data storage zones; and
- additional, by the computing device, parity storage zones; and
- wherein the checksum information is generated based on the data storage zones and the parity zones using Reed Solomon encoding.

10. The method as set forth in claim 7 wherein the data object is stored in the store area of the data storage zone in append-only log format.

11. The method as set forth in claim 7 wherein the checksum information is stored in the store area of the parity storage zone in-place relative to a prior version of the checksum information.

12. The method as set forth in claim 7 further comprising transmitting, by the computing device, an acknowledgement to the data storage zone in response to receiving the update from the data storage zone.

13. A non-transitory computer readable medium having stored thereon instructions for managing storage comprising machine executable code which when executed by at least one processor causes the processor to perform steps comprising:
- storing a data object in a staging area of a data storage zone;
- transferring the stored data object to a store area of the data storage zone without establishing a commit protocol with a parity storage zone;
- updating a revision value associated with the data storage zone in response to the transfer;
- identifying prior unprocessed updates associated with the data storage zone by comparing the updated revision value to an element of a contribution vector associated with the data storage zone, wherein the identify further comprises determine when information associated with one of the identified prior unprocessed updates is not available in the parity storage zone and request for the information associated with the one of the identified prior unprocessed updates from the data storage zone when the information is determined to be not available;
- sequentially generating and storing in a store area of the parity storage zone, checksum information associated with the identified prior unprocessed updates in an order determined based on the updated revision value and revision values of the identified prior unprocessed updates; and
- updating the element of the contribution vector with the sequentially generated checksum information.

14. The medium as set forth in claim 13 wherein the checksum information is generated using erasure coding.

15. The medium as set forth in claim 13 further comprising:
- additional data storage zones; and
- additional parity storage zones; and
- wherein the checksum information is generated based on the data storage zones and the parity zones using Reed Solomon encoding.

16. The medium as set forth in claim 13 wherein the data object is stored in the store area of the data storage zone in append-only log format.

17. The medium as set forth in claim 13 wherein the checksum information is stored in the store area of the parity storage zone in-place relative to a prior version of the checksum information.

18. The medium as set forth in claim 13 further comprising transmitting an acknowledgement to the data storage zone in response to receiving the update from the data storage zone.

* * * * *